(12) United States Patent
Lee et al.

(10) Patent No.: US 9,385,544 B2
(45) Date of Patent: Jul. 5, 2016

(54) EXTERNAL BATTERY

(71) Applicant: SAMSUNG SDI CO., LTD., Yongin-si, Gyeonggi-do (KR)

(72) Inventors: Seok-Bong Lee, Yongin-si (KR); Heui-Sang Yoon, Yongin-si (KR); Hyung-Sin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 127 days.

(21) Appl. No.: 14/255,950

(22) Filed: Apr. 17, 2014

(65) Prior Publication Data

US 2014/0333251 A1 Nov. 13, 2014

(30) Foreign Application Priority Data

May 7, 2013 (KR) .................. 10-2013-0051300

(51) Int. Cl.
*H02J 7/00* (2006.01)

(52) U.S. Cl.
CPC ......... *H02J 7/0029* (2013.01); *H02J 2007/004* (2013.01); *H02J 2007/0037* (2013.01)

(58) Field of Classification Search
CPC ............ B60L 11/1866; B60L 11/1879; B60L 11/1861; B60L 11/1855; B60L 2240/545; B60L 2240/547; Y02T 10/7061; Y02T 10/7072; A61N 1/3787; H01M 10/482; H01M 10/486; H01J 7/0016; H01J 7/0004
USPC ................................................ 320/107–115
See application file for complete search history.

(56) References Cited

U.S. PATENT DOCUMENTS

| | | | | |
|---|---|---|---|---|
| 8,319,471 | B2 * | 11/2012 | Adest | H02J 7/0063 257/140 |
| 2003/0122523 | A1 * | 7/2003 | Kim | H02J 7/007 320/112 |
| 2008/0303483 | A1 * | 12/2008 | Okuto | H01R 13/6625 320/128 |

FOREIGN PATENT DOCUMENTS

| KR | 10-2007-0081251 A | 8/2007 |
|---|---|---|
| KR | 10-2007-0088991 A | 8/2007 |
| KR | 10-2011-0019970 A | 3/2011 |

* cited by examiner

*Primary Examiner* — Binh Tat
(74) *Attorney, Agent, or Firm* — Lewis Roca Rothgerber Christie LLP

(57) ABSTRACT

An external battery includes an input end, an output end, a bare cell between the input end and the output end, a charging unit configured to deliver power from a charger to the bare cell via the input end, a first switch between the charging unit and the input end, a DC-DC converter configured to convert an output voltage from the bare cell into a converted voltage of a magnitude that is different from that of the output voltage, and configured to deliver the converted voltage to the output end, a second switch between the bare cell and the DC-DC converter, and a main controller unit (MCU) configured to sense at least one of overcharging, over-discharging, or an over-discharge current of the bare cell using the output voltage or an output current from the bare cell, and configured to control the first switch and the second switch.

16 Claims, 2 Drawing Sheets

EXTERNAL BATTERY

CROSS-REFERENCE TO RELATED APPLICATION

This application claims priority to and the benefit of Korean Patent Application No. 10-2013-0051300, filed on May 7, 2013, in the Korean Intellectual Property Office, the entire contents of which are incorporated herein by reference in their entirety.

BACKGROUND

1. Field

An embodiment of the present invention relates to an external battery.

2. Description of the Related Art

Recent electronic appliances, for example, a palmtop computer, a mobile phone, PDA, etc., are developed for portable use. These portable electronic appliances may be supplied with the electric power required for their use from a battery. The recent portable electronic appliances have their own functions, and additional functions are gradually added to diversify the functions of the portable electronic appliance, such that even a single portable electronic appliance performs various functions. Thus, the amount of electric power necessary to use the portable electronic appliance is gradually increasing, and a primary battery with a large capacity may be used.

Furthermore, an external battery, which is not attached to the portable electronic appliance, but is instead carried separately, is developed.

FIG. 1 is a block diagram schematically illustrating a configuration of an existing external battery. Referring to FIG. 1, an input end (e.g., input terminal(s)) 31 of an external battery 30 is fed with external electric power from a charger 10. A main controller unit (MCU) 32 senses a voltage at the input end 31 to detect a type of the charger 10, and to control an output current of a charger integrated circuit (charger IC) 33, and the charger IC 33 feeds electric current to a battery 34. In addition, the MCU 32 senses a voltage of the battery 34, and displays the sensed voltage on a display unit 37. The voltage outputted from the battery 34 is boosted by a DC-DC converter 35, and is fed to an external device 20 via an output end (e.g., output terminal(s)) 36 of the external battery 30.

A rechargeable secondary battery may be employed as the battery 34 mounted in the external battery 30. This secondary battery 34 is made by electrically coupling a bare cell 34a, which includes a can that is sealed and accommodates an electrode assembly and electrolyte, to a protection circuit module (PCM circuit) 34b. The PCM circuit 34b protects the bare cell 34a by preventing overcharging (e.g., overcharge voltage) that may otherwise occur when recharging the bare cell 34a.

In the external battery 30, the PCM circuit 34b senses the voltage of the battery 34 to prevent overcharging/over-re-charging, and to control the current used to charge the battery, while the MCU 32 also senses the voltage of the battery 34 to enable the display of a capacity (e.g., a remaining energy capacity) of the battery, thereby duplicating the sensing of the voltage of the battery 34.

SUMMARY

Embodiments of the present invention provide an external battery configured to protect a battery mounted within the external battery by using an MCU of the external battery instead of a PCM.

Other aspects of embodiments of the present invention will be achieved from the following described embodiments by a person having ordinary skill in the art.

According to one embodiment of the present invention, there is provided an external battery including an input end, an output end, a bare cell between the input end and the output end, a charging unit configured to deliver power from a charger to the bare cell via the input end, a first switch between the charging unit and the input end, a DC-DC converter configured to convert an output voltage from the bare cell into a converted voltage of a magnitude that is different from that of the output voltage, and configured to deliver the converted voltage to the output end, a second switch between the bare cell and the DC-DC converter, and a main controller unit (MCU) configured to sense at least one of overcharging, over-discharging, or an over-discharge current of the bare cell using the output voltage or an output current from the bare cell, and configured to control the first switch and the second switch.

The external battery may further include a voltage-sensing unit electrically coupled to the bare cell and configured to sense the output voltage to transmit a value corresponding to the sensed output voltage to the MCU.

When the sensed output voltage reaches an overcharging prevention voltage, the MCU may switch the first switch off to block the power to the bare cell.

When the sensed output voltage drops below the overcharging prevention voltage, the first switch may be turned on, or when the sensed output voltage raises above the over-discharge prevention voltage, the second switch may be switched on.

When the sensed output voltage reaches an over-discharge prevention voltage, the MCU may switch the second switch off to block the output current from the bare cell.

The external battery may further include a current-sensing unit between the bare cell and the DC-DC converter that is configured to sense the output current from the bare cell, and that is configured to transmit a value corresponding to the sensed output current from the bare cell to the MCU.

The current-sensing unit may include a current shunt resistor.

When the sensed output current from the bare cell or the sensed output current from the DC-DC converter reaches an over-discharge current, the MCU may switch the second switch off to block the output current from the bare cell.

When the sensed output current from the bare cell or the sensed output current from the DC-DC converter is below the over-discharge current, the MCU may switch the second switch off.

The external battery may further include a current-sensing unit between the DC-DC converter and the output end that is configured to sense an output current from the DC-DC converter, and that is configured to transmit a value corresponding to the sensed output current from the DC-DC converter to the MCU.

The MCU may be configured to analyze specifications of the charger coupled to the input end using a voltage of the input end, and may be configured to control the charging unit to feed a maximum charging current, which corresponds to the specifications of the charger, to the bare cell.

The external battery may further include a display unit configured to display a remaining energy capacity of the bare cell, and the MCU may control the display unit using a voltage from the bare cell.

Accordingly, the battery mounted in the external battery may be protected by the MCU of the external battery.

BRIEF DESCRIPTION OF THE DRAWINGS

Example embodiments of the present invention will be described more fully hereinafter with reference to the accompanying drawings. However, the described embodiments may be embodied in different forms, and the descriptions thereof should not be construed as limited to the embodiments set forth herein. Rather, the described embodiments are provided so this disclosure will be thorough and complete, and will full convey the scope of the example embodiments to those skilled in the art.

In the figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
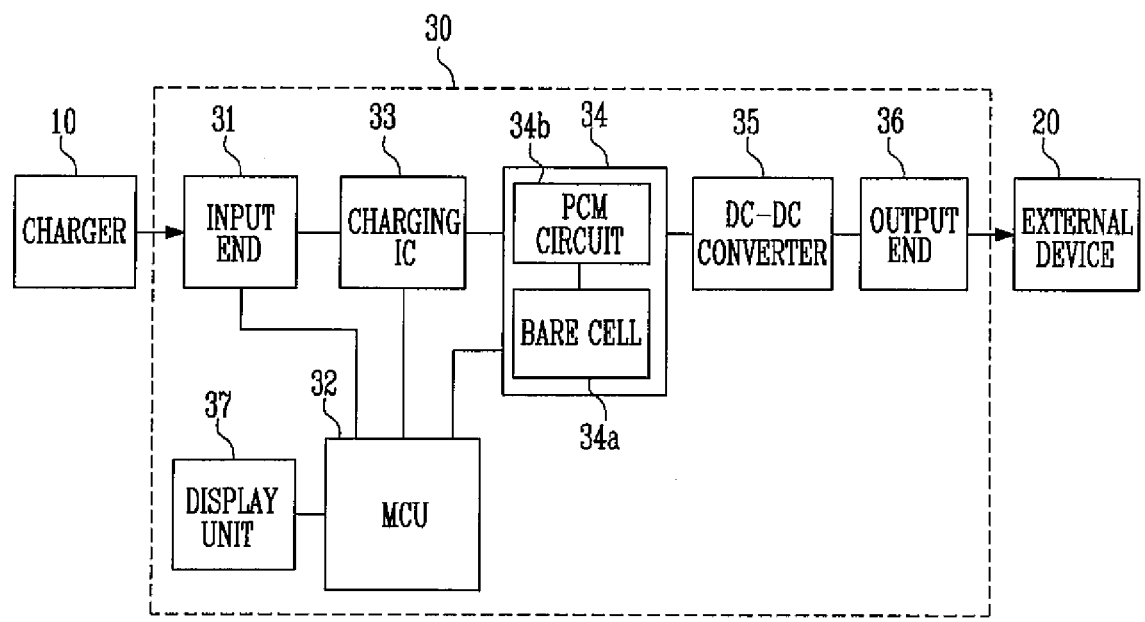
FIG. 1 is a block diagram schematically illustrating a configuration of an conventional external battery.

Details of embodiments of the present invention are included in the detailed description and the drawings.

Aspects of embodiments of the present invention will be more apparent from the following description taken in conjunction with the accompanying drawings. However, the present invention is not limited to the following described embodiments, but may be implemented in various forms. Further, a described connection/coupling of a component to another component includes both a direct connection and an indirect electrical connection with one or more other devices therebetween. In the drawings, portions that are irrelevant to the present invention may be omitted for the clear description of the described embodiments of the present invention. Like reference numerals are designated to like elements throughout the specification.

Hereinafter, embodiments of the present invention will be described in detail with reference to the accompanying drawings.

In the conventional external battery, a PCM circuit electrically coupled to a bare cell senses a voltage of a battery to prevent overcharging and over-discharging (e.g., to prevent reaching an overcharge voltage or an over-discharge voltage), and to control over-discharge current (e.g., discharge overcurrent) of the battery.

Figure 2:
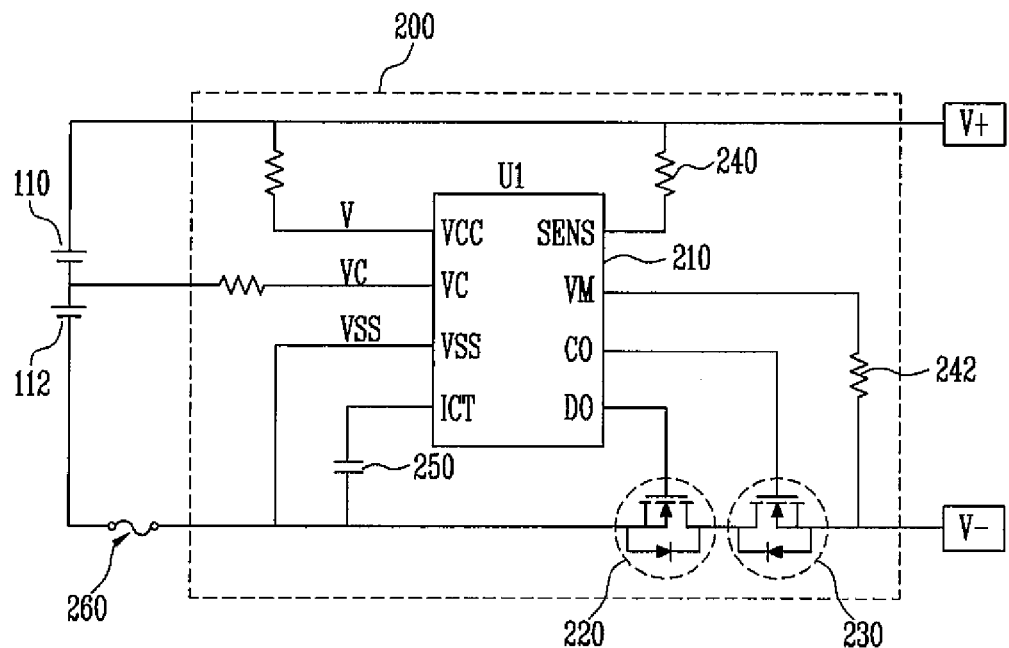
FIG. 2 is a circuit diagram illustrating configuration of a PCM of a secondary battery.

FIG. 2 is a circuit diagram illustrating a configuration of a PCM of a secondary battery. Referring to FIG. 2, the PCM 200 includes active devices, such as a control integrated circuit (control IC) 210, MOSFETs 220 and 230, a voltage sensor 240, a current sensor 242, and a capacitor 250.

A fuse or a positive temperature coefficient (PTC) 260 is coupled to the negative electrodes of the battery cells 110 and 112, which are coupled to each other in series, and external input and output terminals V+ and V− are coupled to both ends of the directly-coupled bare cells 110 and 112.

Operations of the battery cells 110 and 112 are as follows: when one of a detected voltage of the first battery cell 110 (a voltage between VC and V sensed by a voltage sensor) and a detected voltage of the second battery cell 112 (a voltage between VC and VSS) reaches an over-recharging prevention voltage (e.g., an overcharge status), the control IC 210 switches the charging MOSFET 230 off to interrupt the current (e.g., recharging current).

Similarly, when one of the voltage of the first battery cell 110 and the detected voltage of the second battery cell 112 reaches an over-discharging prevention voltage (e.g., over-discharge status), the control IC 210 switches the discharging MOSFET 220 off to interrupt current (e.g., discharging current). Overcurrent is interrupted when the control IC 210 switches the discharging MOSFET 220 off due to voltage difference between the current sensor 242 and VSS.

However, though the PCM improves battery safety by effectively controlling/preventing overvoltage and overcurrent, the employed active devices 210, 220, and 230 are relatively expensive, thereby leading to an increase in manufacturing costs of the battery.

Contrastingly, embodiments of the present invention provide an external battery configured to avoid overcharging, over-discharging, and to control discharge overcurrent of a battery mounted in an external battery using an MCU provided in the external battery (instead of the PCM), thereby reducing the overall size of the circuit, and thereby reducing manufacturing costs.

Figure 3:
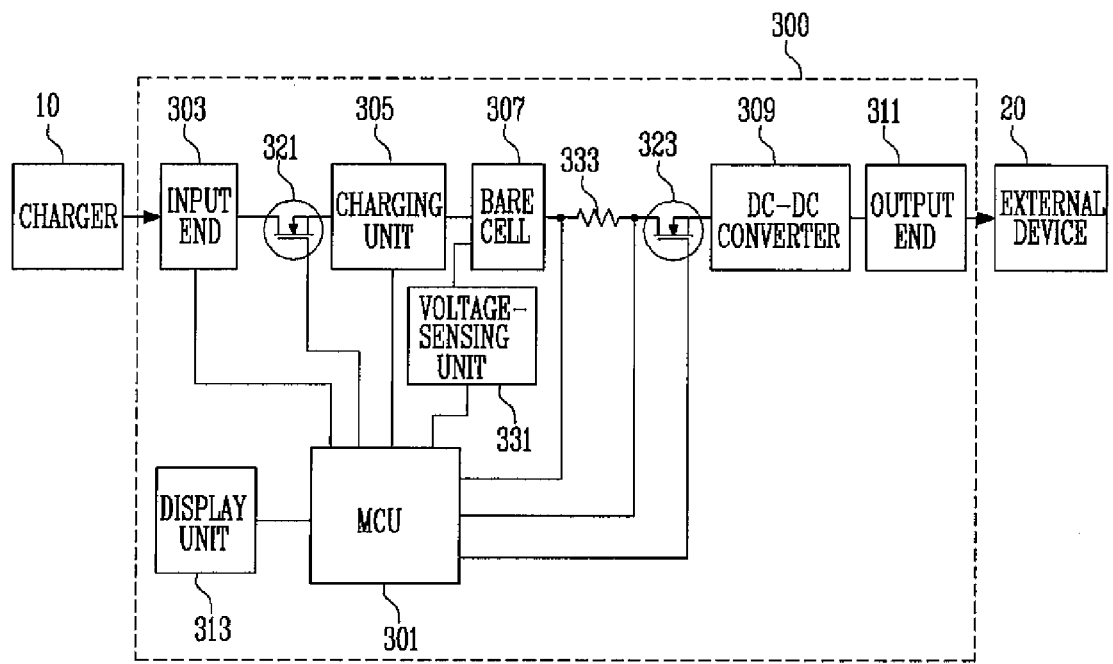
FIG. 3 is a block diagram illustrating an external battery according to an embodiment of the present invention.

FIG. 3 is a block diagram illustrating an external battery according to an embodiment of the present invention. Referring to FIG. 3, an external battery 300 may include an MCU 301, an input end 303, a charging unit 305, a bare cell 307, a DC-DC converter 309, and an output end 311.

The MCU 301 controls many of the components in the external battery 300, and methods of operating the MCU 301 and other components will be described in detail.

The input end 303 is configured to be coupled to a terminal(s) of a charger 10 to deliver an external power from the charger 10 to the charging unit 305. The input end 301 may be implemented in various forms according to the type of charger 10.

The charging unit 305 generates a charging current using the external power from the input end 303, and feeds the generated charging current to the bare cell 307 to recharge the bare cell 307. Magnitude of the maximum charging current outputted from the charging unit 305 may vary according to the type of the charging unit 305 coupled to the input end 303. Therefore, the MCU 303 may check or analyze specifications of the charging unit 305 by sensing a voltage flowing through the input end 303, and may control the charging unit 305 such that no more than the maximum charging current suitable for the charger 10 is outputted from the charging unit 305.

The bare cell 307 is a dischargeable and rechargeable battery cell 307 in which an electrode assembly having a positive electrode/separator film/negative electrode-structure is immerged into electrolyte and is sealed in a battery case. In general, this type of electrode assembly has two subtypes: one is a jelly-roll type electrode assembly (winding type) in which long sheet type positive and negative electrodes, both sides of which are coated with active materials, are wound by intervening a separator film therebetween; the other is a stack type electrode assembly (accumulation type) in which a plurality of positive electrodes and negative electrodes, both sides of which are coated with active materials, are sequentially stacked with a plurality of intervening separator films therebetween.

A cylinder type bare cell and a rectangular type bare cell, in which an electrode assembly is mounted in a metal battery case, and a pouch type bare cell, in which an electrode assembly is mounted in an aluminum laminate sheet, may be used as the bare cell 307 in different embodiments of the present invention. In addition, the bare cell 307 may be two or more bare cells coupled to each other in serial and/or in parallel.

The DC-DC converter 309 converts a voltage outputted from the bare cell 307 into a voltage of a magnitude for driving an external device, and delivers the converted voltage to the output end 311.

The output end 311 is configured to be coupled to the external device 30 to deliver the electric energy fed from the bare cell 307 to the external device 30. The output end 311 may be implemented in various forms according to the type of external device 30 to which it is to be coupled.

The display unit 313 displays a capacity (e.g., remaining energy capacity) of the bare cell 307, and the MCU 301 may control or power the display unit 313 using the voltage of the bare cell 307.

The MCU 301 of the present embodiment senses overcharging, over-discharging, and over-discharge current of the bare cell 307 by sensing the voltage and the output current of the bare cell 307, and controls a first switch 321 located between the input end 303 and the charging unit 305, and controls a second switch 323 located between the bare cell 307 and the DC-DC converter 309.

A voltage-sensing unit 331 is electrically coupled to the bare cell 307 to sense an output voltage and to deliver the sensed output voltage to the MCU 301. When the output voltage sensed by the voltage-sensing unit 331 reaches an overcharging prevention voltage (e.g., a voltage that is lower than an overcharge voltage), the MCU 301 switches the first switch 321 off to interrupt the feeding of external power and to protect the bare cell 307. When the output voltage sensed by the voltage-sensing unit 331 reaches an over-discharge prevention voltage (e.g., a voltage that is higher than an over-discharge prevention voltage), the MCU 301 switches the second switch 323 off to interrupt the output current from the bare cell 307 and to protect the bare cell 307.

Additionally, when the sensed output voltage drops below the overcharging protection voltage, or raises above the over-discharge protection voltage, the MCU 301 switches the first switch 321 or the second switch 323 on, respectively, to allow charging or discharging of the bare cell 307.

The first switch 321 and the second switch 323, as illustrated in FIG. 3, may be transistors, but are not limited thereto.

A current-sensing unit 333 is located between the bare cell 307 and the DC-DC converter 309 to sense an output current of the bare cell 307 and to deliver the sensed output current to the MCU 301. As illustrated in FIG. 3, the current-sensing unit 333 may include a current shunt resistor.

When the output current sensed by the current-sensing unit 333 reaches the over-discharge current, the MCU 301 switches the second switch 323 off to interrupt the output current of the bare cell 307.

According to the present embodiment, because the MCU 301 of the external battery 300 controls the first switch 321 and the second switch 323 in the overcharging (e.g., overcharge voltage), over-discharging (e.g., over-discharge voltage), and over-discharge current of the bare cell 307, the bare cell 307 does not need a PCM as a separate protection circuit. Therefore, soldering between the bare cell 307 and the MCU 301 may be enabled instead of welding the bare cell 307 to the PCM. By doing so, a smaller external battery 300 having simplified circuitry may be provided. In addition, because the specifications of the MCU 301 may be changed with firmware, the MCU 301 of the same IC chip may have various specifications. That is, values such as over-discharge voltage, overcharge voltage, and over-discharge current, which may be different among various types of bare cells 307, can be controlled by the same chip by upgrading firmware.

Figure 4:
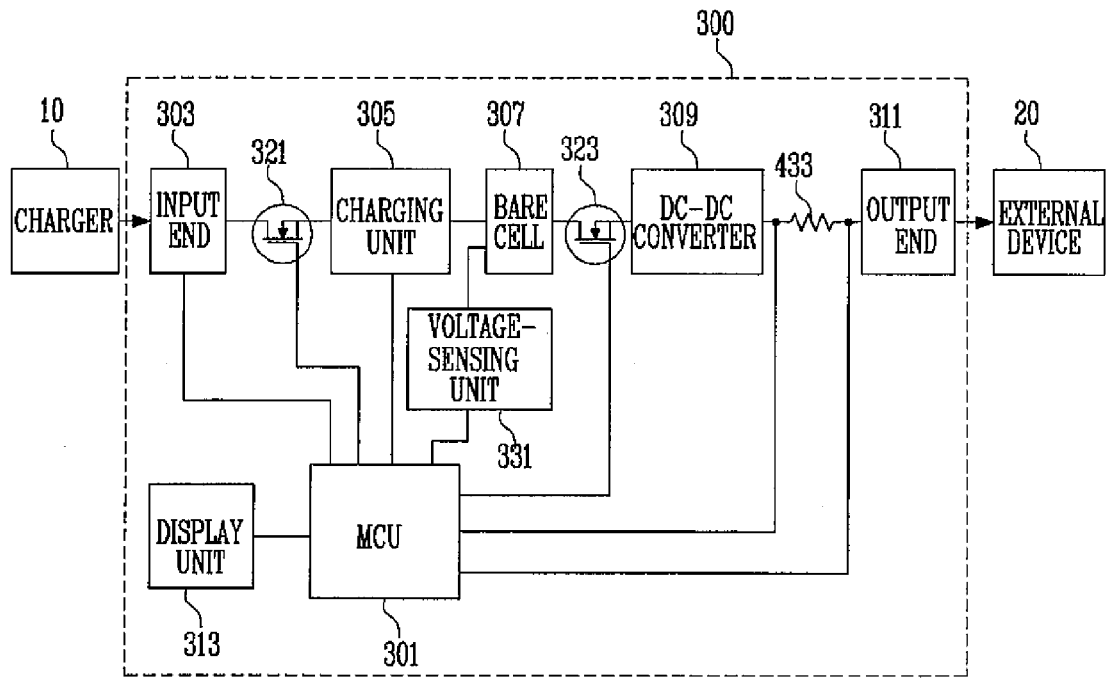
FIG. 4 is a block diagram illustrating an external battery according to another embodiment of the present invention.

FIG. 4 is a block diagram illustrating an external battery according to another embodiment of the present invention. Because the external battery illustrated in FIG. 4 is similar to the external battery illustrated in FIG. 3, with the exception of a current-sensing unit 433, descriptions of identical elements will be omitted.

Referring to FIG. 4, the current-sensing unit 433 is located between the DC-DC converter 309 and the output end 311, and is configured to sense current outputted from the DC-DC converter 309 and to deliver the sensed current to the MCU 301.

The DC-DC converter 309 is configured to boost a voltage, and overcurrent may be generated as a result. Therefore, the current-sensing unit 433 may be located between the DC-DC converter 309 and the output end 311 to sense the output current of the DC-DC converter 309.

When the output current from the DC-DC converter 309 reaches the over-discharge current, the MCU 301 switches the second switch 323 off to interrupt the output current of the bare cell 307.

Example embodiments of the present invention have been disclosed herein, and although specific terms are employed, they are used in, and are to be interpreted in, a generic and descriptive sense only, and are not used for the purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments, unless otherwise specifically indicated. Accordingly, it will be understood by those of skill in the art that various changes in form and details may be made without departing from the spirit and scope of the present invention as set forth in the following claims, and their equivalents.

What is claimed is:

1. An external battery comprising:
    an input end;
    an output end;
    a bare cell between the input end and the output end;
    a charging unit configured to deliver power from a charger to the bare cell via the input end;
    a first switch between the charging unit and the input end;
    a DC-DC converter configured to convert an output voltage from the bare cell into a converted voltage of a magnitude that is different from that of the output voltage, and configured to deliver the converted voltage to the output end;
    a second switch between the bare cell and the DC-DC converter; and
    a main controller unit (MCU) configured to sense at least one of overcharging, over-discharging, or an over-discharge current of the bare cell using the output voltage or an output current from the bare cell, and configured to control the first switch and the second switch to charge or discharge the bare cell based on whether the at least one of overcharging, over-discharging, or the over-discharge current of the bare cell is sensed.

2. The external battery as claimed in claim 1, further comprising a voltage-sensing unit electrically coupled to the bare cell, and configured to sense the output voltage to transmit a value corresponding to the sensed output voltage to the MCU.

3. The external battery as claimed in claim 2, wherein, when the sensed output voltage reaches an overcharging prevention voltage, the MCU is configured to switch the first switch off to block the power to the bare cell so that the charging of the bare cell is stopped.

4. The external battery as claimed in claim 3, wherein, when the sensed output voltage drops below the overcharging prevention voltage, the first switch is configured to be turned on, or
   wherein, when the sensed output voltage raises above an over-discharge prevention voltage, the second switch is configured to be switched on.

5. The external battery as claimed in claim 2, wherein, when the sensed output voltage reaches an over-discharge prevention voltage, the MCU is configured to switch the second switch off to block the output current from the bare cell so that discharging of the bare cell is stopped.

6. The external battery as claimed in claim 5, wherein, when the sensed output voltage drops below an overcharging prevention voltage, the first switch is configured to be turned on, or
   wherein, when the sensed output voltage raises above the over-discharge prevention voltage, the second switch is configured to be switched on.

7. The external battery as claimed in claim 1, further comprising a current-sensing unit between the bare cell and the DC-DC converter that is configured to sense the output current from the bare cell, and that is configured to transmit a value corresponding to the sensed output current from the bare cell to the MCU.

8. The external battery as claimed in claim 7, wherein the current-sensing unit comprises a current shunt resistor.

9. The external battery as claimed in claim 7, wherein, when the sensed output current from the bare cell or the sensed output current from the DC-DC converter reaches an over-discharge current, the MCU is configured to switch the second switch off to block the output current from the bare cell.

10. The external battery as claimed in claim 7, wherein, when the sensed output current from the bare cell or the sensed output current from the DC-DC converter is below the over-discharge current, the MCU is configured to switch the second switch on.

11. The external battery as claimed in claim 1, further comprising a current-sensing unit between the DC-DC converter and the output end that is configured to sense an output current from the DC-DC converter, and that is configured to transmit a value corresponding to the sensed output current from the DC-DC converter to the MCU.

12. The external battery as claimed in claim 11, wherein the current-sensing unit comprises a current shunt resistor.

13. The external battery as claimed in claim 11, wherein, when the sensed output current from the bare cell or the sensed output current from the DC-DC converter reaches an over-discharge current, the MCU is configured to switch the second switch off to block the output current from the bare cell.

14. The external battery as claimed in claim 11, wherein, when the sensed output current from the bare cell or the sensed output current from the DC-DC converter is below the over-discharge current, the MCU is configured to switch the second switch on.

15. The external battery as claimed in claim 1, wherein the MCU is configured to analyze specifications of the charger, which is coupled to the input end, using a voltage of the input end, and is configured to control the charging unit to feed a maximum charging current, which corresponds to the specifications of the charger, to the bare cell.

16. The external battery as claimed in claim 1, further comprising a display unit configured to display a remaining energy capacity of the bare cell,
   wherein the MCU is configured to control the display unit using a voltage from the bare cell.

* * * * *